(12) United States Patent
Liu et al.

(10) Patent No.: US 7,614,754 B2
(45) Date of Patent: Nov. 10, 2009

(54) OPTICAL PROJECTION APPARATUS

(75) Inventors: Chin-Ku Liu, Miao-Li County (TW); Sze-Ke Wang, Miao-Li County (TW)

(73) Assignee: Coretronic Corporation, Miao-Li County (TW)

( * ) Notice: Subject to any disclaimer, the term of this patent is extended or adjusted under 35 U.S.C. 154(b) by 421 days.

(21) Appl. No.: 11/403,415

(22) Filed: Apr. 12, 2006

(65) Prior Publication Data

US 2006/0238719 A1  Oct. 26, 2006

(30) Foreign Application Priority Data

Apr. 21, 2005  (TW) ............... 94112671 A

(51) Int. Cl.
 *G03B 21/28* (2006.01)
(52) U.S. Cl. ............ 353/98; 353/81; 348/771; 349/5
(58) Field of Classification Search ......... 353/81, 353/98, 99, 119; 348/742, 743, 5, 771
See application file for complete search history.

(56) References Cited

U.S. PATENT DOCUMENTS

| 5,245,369 | A  | * | 9/1993 | Um et al. ............... 353/122 |
| 6,229,581 | B1 |   | 5/2001 | Yamamoto et al. ....... 348/757 |
| 6,474,819 | B2 | * | 11/2002 | Yoder et al. ............ 353/98 |
| 6,596,648 | B2 | * | 7/2003 | Wu et al. ............... 438/745 |
| 6,666,557 | B1 |   | 12/2003 | Choi ................... 353/31 |
| 6,817,719 | B2 | * | 11/2004 | Rudolph et al. .......... 353/37 |
| 7,128,425 | B2 | * | 10/2006 | Kumai .................. 353/119 |
| 7,245,327 | B2 | * | 7/2007 | Willis .................. 348/771 |
| 2004/0184012 | A1 |   | 9/2004 | Hori ................... 353/99 |

FOREIGN PATENT DOCUMENTS

| JP | 03-103840 | 4/1991 |
| JP | 06-503660 | 4/1994 |
| JP | 2002-107820 | 4/2002 |
| JP | 2002-517781 | 6/2002 |
| JP | 2004-46026 | 2/2004 |
| JP | 2005-099669 | 4/2005 |

* cited by examiner

*Primary Examiner*—William C Dowling
(74) *Attorney, Agent, or Firm*—J.C. Patents

(57) ABSTRACT

An optical projection apparatus including an illumination system, a reflective light valve, an imaging system, and a reflective component is provided. The illumination system is suitable for providing a light beam and the reflective light valve is disposed on a transmission path of the light beam. The reflective light valve is used for converting the light beam into an image. In addition, the imaging system is disposed on the transmission path of the image. The reflective component is disposed both between the reflective light valve and the imaging system and between the reflective light valve and the illumination system, and disposed on the transmission path of the light beam and the image. The reflective component is used for reflecting the light beam onto the reflective light valve, and then reflecting the image produced by the reflective light valve into the imaging system.

20 Claims, 6 Drawing Sheets

OPTICAL PROJECTION APPARATUS

CROSS-REFERENCE TO RELATED APPLICATION

This application claims the priority benefit of Taiwan application serial no. 94112671, filed on Apr. 21, 2005. All disclosure of the Taiwan application is incorporated herein by reference.

BACKGROUND OF THE INVENTION

1. Field of Invention

The present invention relates to an optical projection apparatus, and particularly to an optical projection apparatus with smaller size and thickness.

2. Description of the Related Art

FIG. 1A and 1B are schematic structure drawings of two conventional optical projection apparatuses. Referring to FIG. 1A, a conventional optical projection apparatus 100a includes an illumination system 110a, a digital micro-mirror device (DMD) 120 and an imaging system 130. The DMD 120 is disposed between the illumination system 110 and the imaging system 130. Wherein, the illumination system 110a includes a light source 112, a light integration rod 113, a plurality of lenses 114 and two reflective mirrors 116a and 116b. The light source 112 is suitable for providing a light beam 11 2a, which passes through the light integration rod 113 and the lenses 114, then is reflected by the reflective mirror 116a onto the reflective mirror 116b and reflected by the reflective mirror 116b onto a lens 114 adjacent to the DMD 120. Further, the light beam 112a is incident into the DMD 120. The DMD 120 converts the light beam 112a into an image 112a' therein and makes it incident into the imaging system 130. Then the image system 130 projects the image 112a' on a screen (not shown).

Referring to FIG. 1B, it is similar to FIG. 1A except the illumination system 110b in the optical projection apparatus 100b includes a light source 112, a light integration rod 113, a plurality of lenses 114 and a reflective mirror 116a. The light beam 112a provided by the light source 112 passes through a light integration rod 113 and lenses 114, and then is reflected by a reflective mirror 116a into a digital micro-mirror device (DMD) 120. The DMD 120 converts the light beam 112a into an image 112a' therein and makes it incident into the imaging system 130. Then the image system 130 projects the image 112a' on a screen (not shown).

In the above-described two optical projection apparatuses 100a and 100b, the optical axis of the imaging system 130 and the optical axis of the digital DMD 120 are parallel to each other, so that a big, unused space 50 is created between the imaging system 130 and the illumination system 110a/110b. That is why the conventional optical projection apparatuses 100a and 100b are bulky with a big size and thickness. Obviously, such conventional design does not meet the compact size requirement in the modern electronic products.

SUMMARY OF THE INVENTION

An object of the present invention is to provide an optical projection apparatus with smaller size and thickness.

Based on the above-mentioned and other objects, the present invention provides an optical projection apparatus, which includes an illumination system, a reflective light valve, an imaging system and a first reflective component. Wherein, the illumination system is suitable for providing a light beam, and the reflective light valve is disposed on the transmission path of the light beam. The reflective light valve is used for converting the light beam into an image. In addition, the imaging system is disposed on the transmission path of the image. The first reflective component is disposed both between the reflective light valve and the imaging system and between the reflective light valve and the illumination system, and disposed on both the transmission path of the light beam and the image. The first reflective component is employed to reflect the light beam onto the reflective light valve and then reflect the image produced by the reflective light valve into the imaging system.

The present invention uses a first reflective component, disposed both between a reflective light valve and an imaging system and between the reflective light valve and an illumination system, for reflecting a light beam onto the reflective light valve and then reflecting an image produced by the reflective light valve into the imaging system. In this way, the imaging system position is changed to be adjacent to the illumination system. Thus, the present invention is able to provide a compact optical projection apparatus with smaller size and thickness.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

Figure 2A:
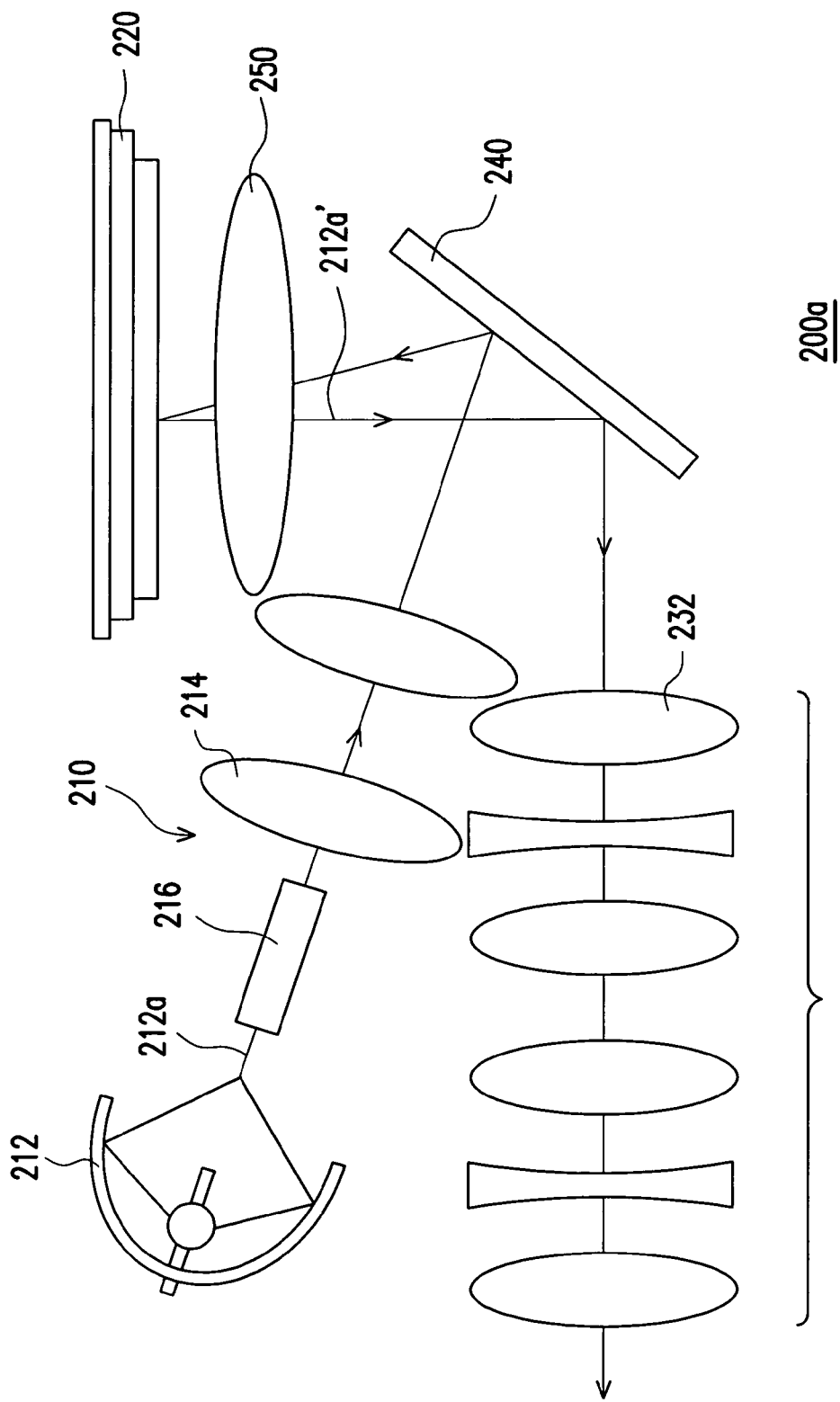
FIGS. 2A and 2B are schematic structure drawings of two optical projection apparatuses according to an embodiment of the present invention.
Figure 2B:
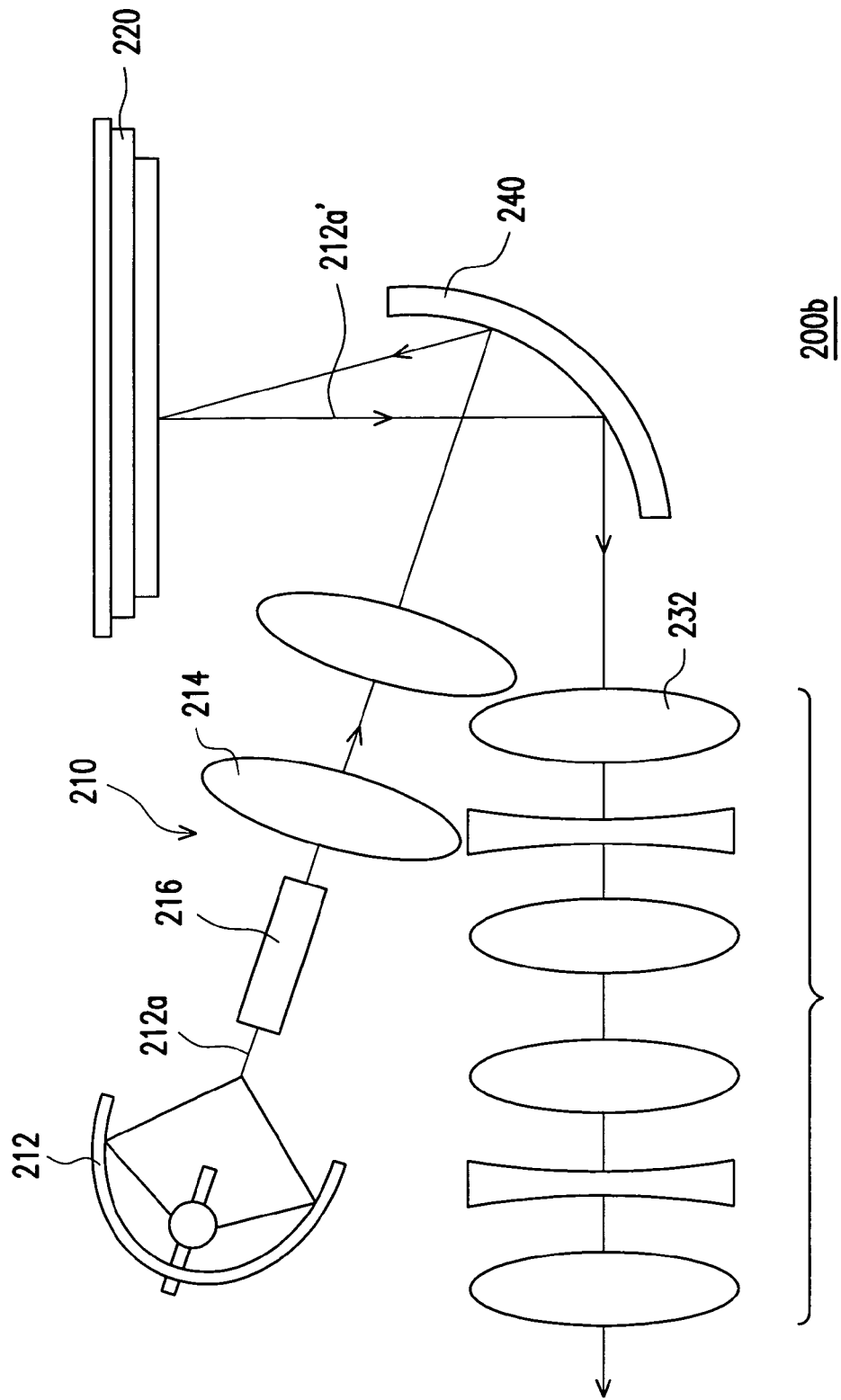

FIGS. 2A and 2B are schematic structure drawings of optical projection apparatuses according to an embodiment of the present invention. Referring to FIGS. 2A and 2B, the optical projection apparatus 200a/200b includes an illumination system 210, a reflective light valve 220, an imaging system 230 and a first reflective component 240. Wherein, the illumination system 210 is suitable for providing a light beam 212a, and the reflective light valve 220 is disposed on a transmission path of the light beam 212a. The reflective light valve 220 is used for converting the light beam 212a into an image 212a'. In addition, the imaging system 230 is disposed on the transmission path of the image 212a'. The first reflective component 240 is disposed both between the reflective light valve 220 and the imaging system 230 and between the reflective light valve 220 and the illumination system 210, and disposed on both the transmission path of the light beam 212a and the image 212a'. The first reflective component 240 is employed to reflect the light beam 212a onto the reflective light valve 220 and then reflect the image 212a' produced by the reflective light valve 220 into the imaging system 230.

In the above-described optical projection apparatus 200a/200b, the illumination system 210 includes, for example, a light source 212 and a plurality of first optical components

214. Wherein, the light source 212 is used for providing a light beam 212*a*. The light source 212 can be, for example, a mercury lamp, a light-emitting diode (LED), a metal-halide lamp, a halogen lamp, a high intensity discharge lamp (HID lamp) or other appropriate light sources, and in an embodiment the halogen lamp is, for example, an ultra high pressure mercury lamp (UHP). In addition, the first optical component 214 is, for example, a lens, a plane mirror, a curved surface mirror, an aspherical mirror, a prism or a combination thereof. The first optical component 214 is disposed on the transmission path of the light beam 212*a*. In an embodiment, the illumination system 210 further includes, for example, a light integration rod 216, which is disposed between the light source 212 and the first optical component 214 to uniform the light beam 212*a* provided by the light source 212.

After passing the first optical component 214, the light beam 212*a* is reflected by the first reflective component 240 onto the reflective light valve 220. Wherein, the first reflective component 240 is, for example, a mirror, which can be a plane mirror (as shown in FIG. 2A), a curved surface mirror (as shown in FIG. 2B) or an aspherical mirror. The first reflective component 240 can be with or without a magnifying function. In addition, the reflective light valve 220 can be a digital micro-mirror device (DMD), a reflective liquid crystal on silicon (LCOS) panel or other reflective imaging components. The reflective light valve 220 is used for converting the light beam 212*a* into an image 212*a*' and reflecting the image 212*a*'.

Thereafter, the image 212*a*' produced by the reflective light valve 220 is reflected onto the first reflective component 240, which then reflects the image 212*a*' into the imaging system 230. The imaging system 230 projects the image 212*a*' on a screen (not shown). The imaging system 230 is, for example, a projection lens, which includes a plurality of second optical components 232. The second optical component 232 is, for example, a lens, a plane mirror, a curved surface mirror, an aspherical mirror, a prism or a combination thereof.

In the optical projection apparatus 200*a*, a lens 250 can be added and disposed between the reflective light valve 220 and the first reflective component 240 to converge the light beam 212*a* for improving the imaging quality.

Figure 1A:
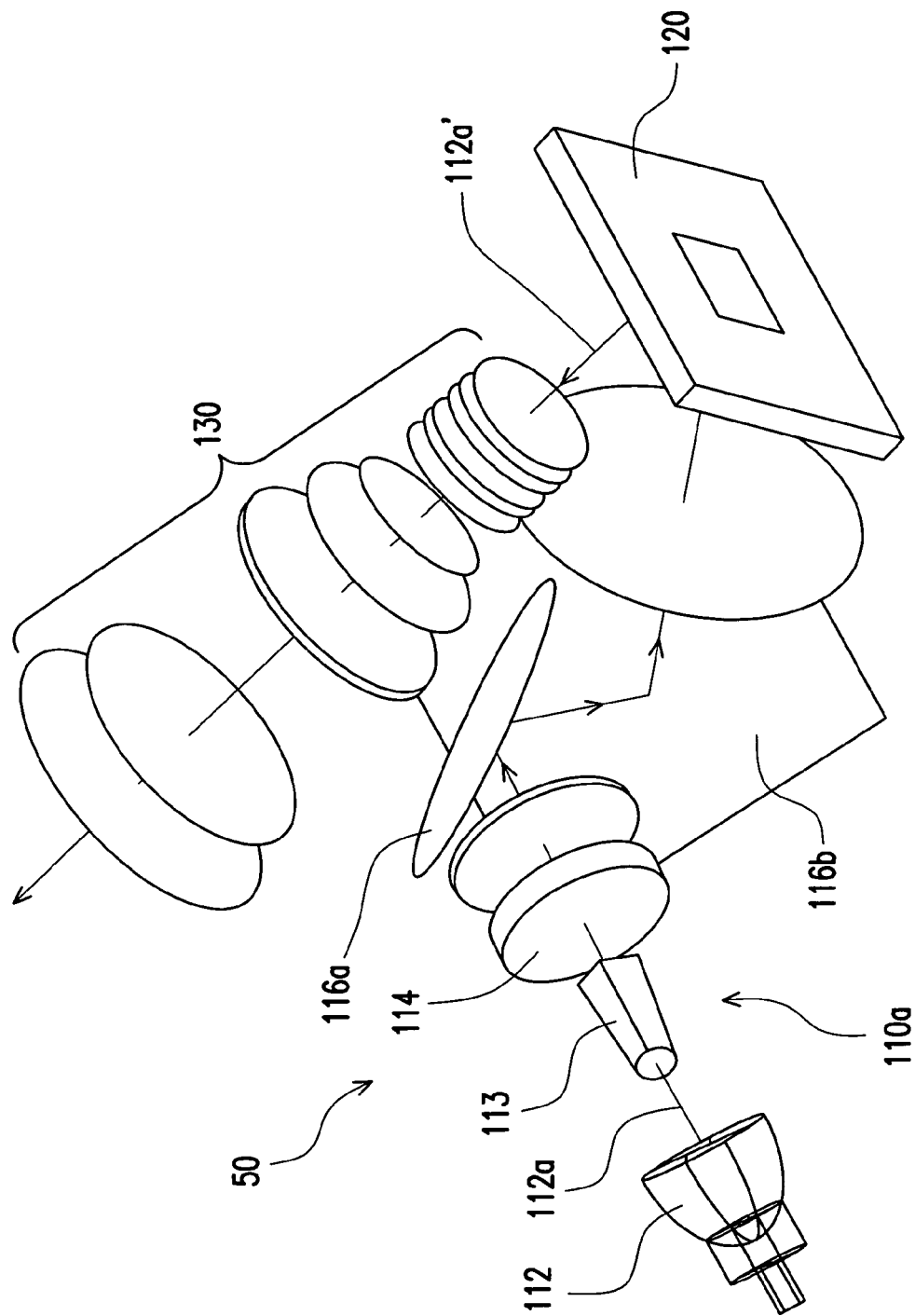
FIGS. 1A and 1B are schematic structure drawings of two conventional optical projection apparatuses.
Figure 1B:
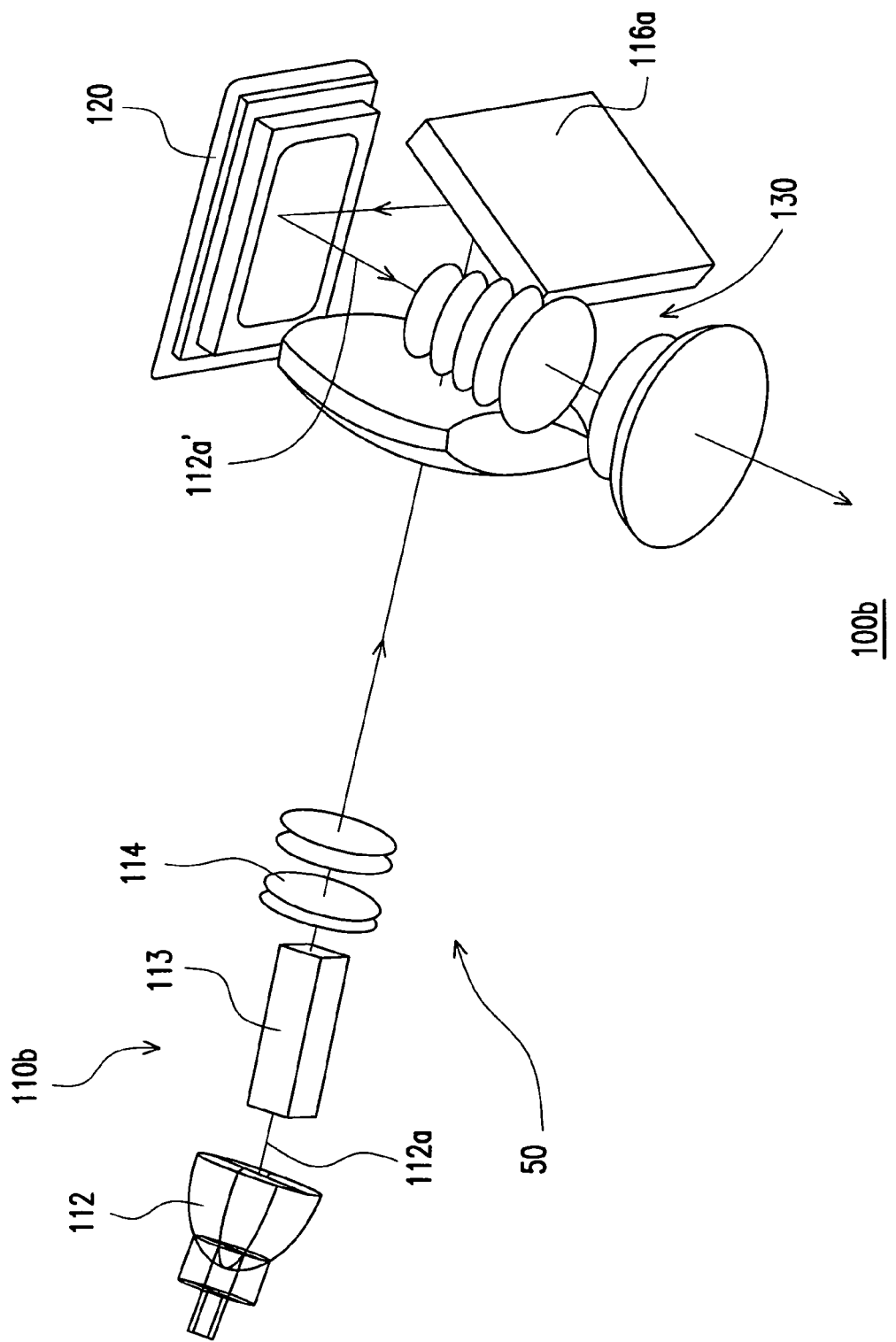

In addition to reflecting the light beam 212*a* provided by the illumination system 210 onto the reflective light valve 220, the first reflective component 240 in the embodiment also serves for reflecting the image 212*a*' produced by the reflective light valve 220 into the imaging system 230. In other words, by adjusting the position angle of the first reflective component 240 and turning the transmission path of the image 212*a*' in the embodiment, the disposition position of the imaging system 230 can be changed, so that the imaging system 230 is adjacent to the illumination system 210. In comparison with the conventional optical projection apparatuses 100*a* and 100*b* (as shown in FIG. 1A and 1B), the optical projection apparatuses 200*a* and 200*b* in the embodiment consequently have smaller size and thickness to meet the compact and requirement of modem electronic products.

The first reflective component 240 is designed to simultaneously reflect the light beam 212*a* and the image 212*a*' in the embodiment, which not only reduces the number of reflective components, but also saves the cost of components, and further downsizes the optical projection apparatuses 200*a* and 200*b*.

Note that in addition to a mirror as shown in FIGS. 2A and 2B, the first reflective component can also be a prism (not shown). The prism has a reflective layer for reflecting the light beam 212*a* onto the reflective light valve 220, and then reflecting the image 212*a*' produced by the reflective light valve 220 into the imaging system 230.

Figure 3:
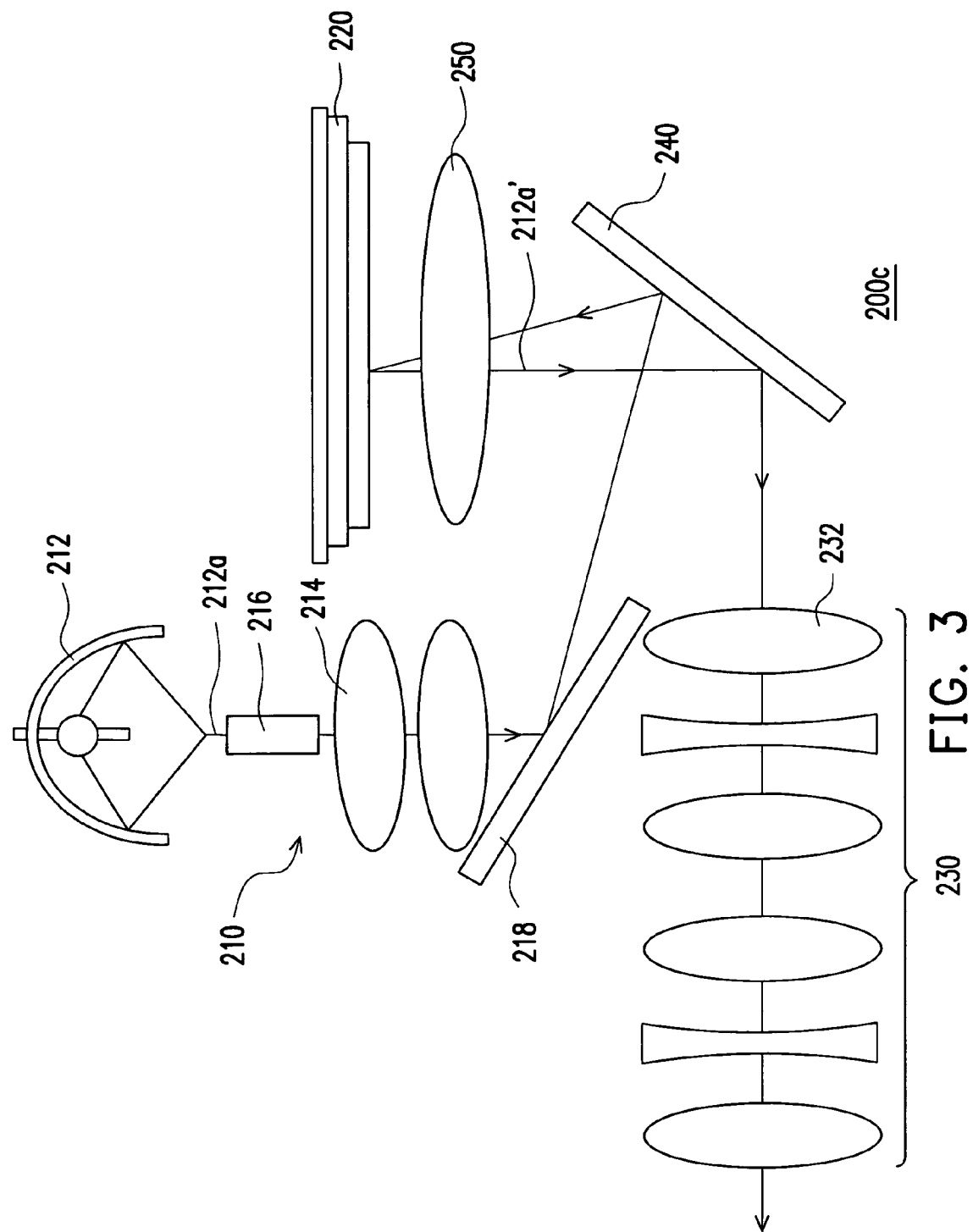
FIG. 3 is a schematic structure drawing of an optical projection apparatuses according to another embodiment of the present invention.

FIG. 3 is a schematic structure drawing of an optical projection apparatuses according to another embodiment of the present invention. Referring to FIG. 3, it is similar to FIG. 2A. For a simple description, only the differences are explained hereinafter. In the optical projection apparatus 200*c* of the embodiment, the illumination system 210 further includes, for example, a second reflective component 218, which is disposed between the first optical component 214 and the first reflective component 240. The second reflective component 218 is, for example, a mirror used for reflecting the light beam 212*a* onto the first reflective component 240.

Figure 4:
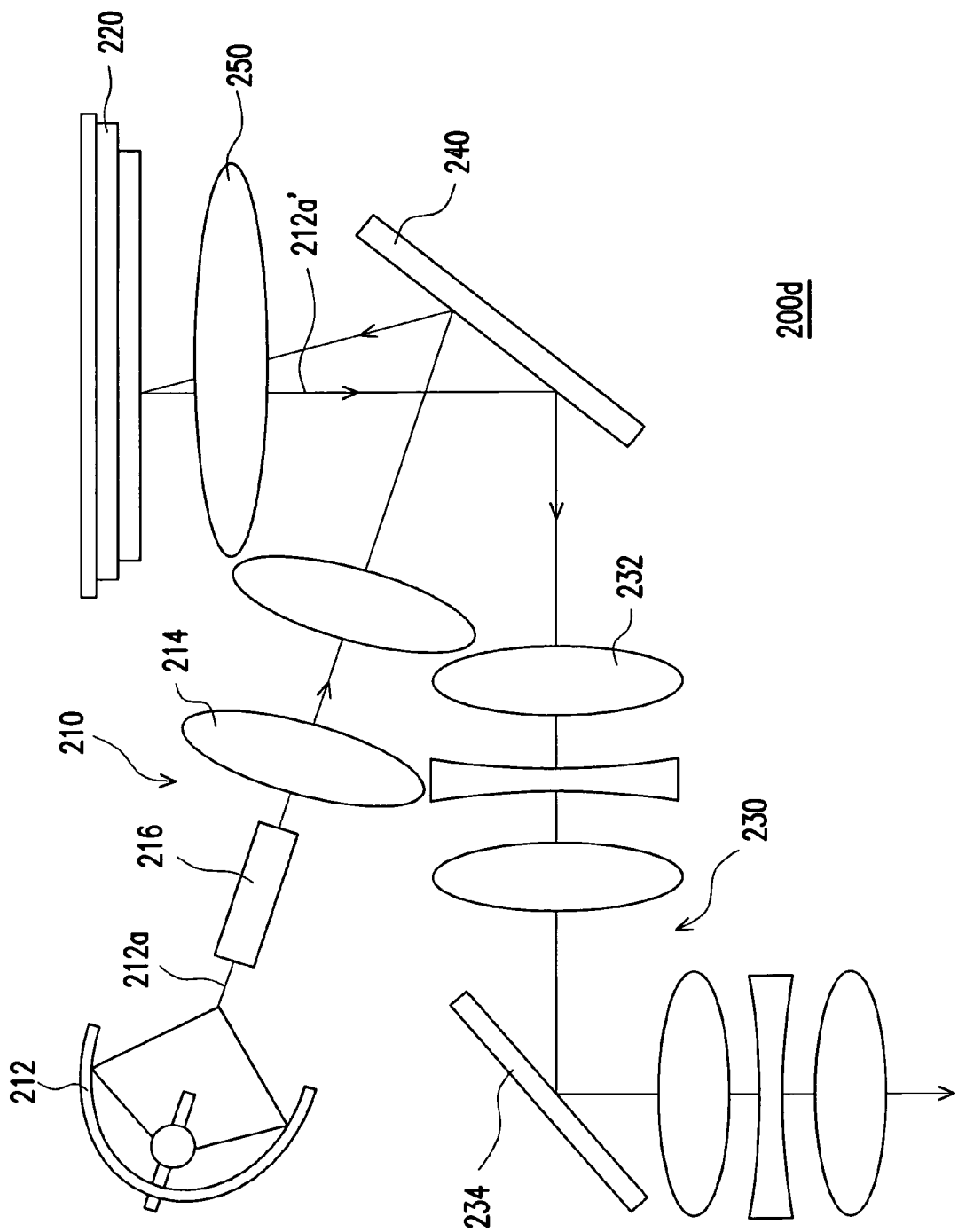
FIG. 4 is a schematic structure drawing of an optical projection apparatuses according to yet another embodiment of the present invention.

FIG. 4 is a schematic structure drawing of an optical projection apparatuses according to yet another embodiment of the present invention. Referring to FIG. 4, the major difference from FIG. 2A is that the imaging system 230 in the optical projection apparatus 200d in FIG. 4 further includes, for example, a third reflective component 234, which is disposed between the second optical components 232. In the embodiment, the third reflective component is, for example, a mirror, used for changing the transmission path of the image 212*a*' such that a turning edge is created in the optical path of the imaging system 230. Therefore, the length of the imaging system 230 can be reduced, and further the length of the optical projection apparatus 200d can be accordingly made shorter.

Accordingly, the optical projection apparatus of the present invention has at least the following advantages:

1. The transmission path of the image can be changed by the first reflective component such that the position of the imaging system can be adjusted to be adjacent to the illumination system. Thus, the optical projection apparatus of the present invention can be made compact and slim.

2. The first reflective component is designed to simultaneously reflect the light beam and the image, which not only reduces the number of reflective components and saves the cost of components, but also downsizes the optical projection apparatus.

3. The third reflective component is disposed between two pieces of the second optical components, which can change the transmission path of the image, shorten the length of the imaging system and further reduce the length of the optical projection apparatus.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. An optical projection apparatus, comprising:
an illumination system, suitable for providing a light beam;
a reflective light valve, disposed on a transmission path of the light beam and suitable for converting the light beam into an image;
an imaging system, disposed on a transmission path of the image;
a first reflective component, disposed both between the reflective light valve and the imaging system and between the reflective light valve and the illumination system, and disposed on the transmission path of the light beam and the image, suitable for reflecting the light beam onto the reflective light valve and then reflecting the image produced by the reflective light valve into the imaging system, wherein the first reflective component does not have a magnifying function; and a lens, disposed between the reflective light valve and the first reflective component and on the transmission path of the light beam and the image.

2. The optical projection apparatus as recited in claim 1, wherein the first reflective component comprises a mirror.

3. The optical projection apparatus as recited in claim 2, wherein the mirror comprises a plane mirror.

4. The optical projection apparatus as recited in claim 1, wherein the first reflective component comprises a prism and the prism has a reflective layer, wherein the reflective layer of the prism is suitable for reflecting the light beam onto the reflective light valve and then reflecting the image produced by the reflective light valve into the imaging system.

5. The optical projection apparatus as recited in claim 1, wherein the illumination system comprises:
  a light source, suitable for providing the light beam; and
  a plurality of first optical components, disposed on the transmission path of the light beam.

6. The optical projection apparatus as recited in claim 5, wherein the first optical components comprise a lens, a plane mirror, a curved surface mirror, an aspherical mirror, a prism or a combination thereof.

7. The optical projection apparatus as recited in claim 5, wherein the illumination system further comprises a light integration rod disposed between the light source and the first optical components.

8. The optical projection apparatus as recited in claim 5, wherein the light source comprises a mercury lamp, a light-emitting diode (LED), a metal-halide lamp, a halogen lamp or a high intensity discharge lamp (HID lamp).

9. The optical projection apparatus as recited in claim 5, wherein the illumination system further comprises a second reflective component disposed between the first optical components and the first reflective component for reflecting the light beam onto the first reflective components.

10. The optical projection apparatus as recited in claim 9, wherein the second reflective component comprises a mirror.

11. The optical projection apparatus as recited in claim 1, wherein the imaging system comprises a projection lens.

12. The optical projection apparatus as recited in claim 11, wherein the projection lens comprises a plurality of second optical components.

13. The optical projection apparatus as recited in claim 12, wherein the second optical components comprise a lens, a plane mirror, a curved surface mirror, an aspherical mirror, a prism or a combination thereof.

14. The optical projection apparatus as recited in claim 12, wherein the projection lens further comprises a third reflective component disposed between the second optical components.

15. The optical projection apparatus as recited in claim 14, wherein the third reflective component comprises a minor.

16. The optical projection apparatus as recited in claim 1, wherein the reflective light valve comprises a digital microminor device (DMD) or a reflective liquid crystal on silicon (LCOS) panel.

17. An optical projection apparatus, comprising:
  an illumination system, suitable for providing a light beam;
  a reflective light valve, disposed on a transmission path of the light beam and suitable for converting the light beam into an image;
  an imaging system, disposed on a transmission path of the image;
  a first reflective component, disposed both between the reflective light valve and the imaging system and between the reflective light valve and the illumination system, and disposed on the transmission path of the light beam and the image, suitable for reflecting the light beam onto the reflective light valve and then reflecting the image produced by the reflective light valve into the imaging system, wherein the first reflective component comprises a prism and the prism has a reflective layer, wherein the reflective layer of the prism is suitable for reflecting the light beam onto the reflective light valve and then reflecting the image produced by the reflective light valve into the imaging system; and
  a lens, disposed between the reflective light valve and the first reflective component and on the transmission path of the light beam and the image.

18. The optical projection apparatus as recited in claim 17, wherein the illumination system comprises:
  a light source, suitable for providing the light beam; and
  a plurality of first optical components, disposed on the transmission path of the light beam.

19. The optical projection apparatus as recited in claim 18, wherein the illumination system further comprises a light integration rod disposed between the light source and the first optical components.

20. The optical projection apparatus as recited in claim 18, wherein the illumination system further comprises a second reflective component disposed between the first optical components and the first reflective component for reflecting the light beam onto the first reflective components.

* * * * *